(12) United States Patent
Peteln (10) Patent No.: US 6,726,749 B2
(45) Date of Patent: Apr. 27, 2004

(54) APPARATUS AND METHOD FOR WET FILTERING MACHINE EXHAUST

(75) Inventor: Erich Peteln, Blumau (AT)

(73) Assignee: Dexwet USA, LLC, Steyr-Gleink (AT)

( * ) Notice: Subject to any disclaimer, the term of this patent is extended or adjusted under 35 U.S.C. 154(b) by 0 days.

(21) Appl. No.: 10/060,950

(22) Filed: Jan. 29, 2002

(65) Prior Publication Data

US 2002/0104437 A1 Aug. 8, 2002

Related U.S. Application Data

(63) Continuation-in-part of application No. 09/569,819, filed on May 12, 2000, now Pat. No. 6,375,717.

(51) Int. Cl.[7] .............................. B01D 47/14
(52) U.S. Cl. ..................... 95/211; 96/274; 96/296; 261/103; 261/104; 261/DIG. 17
(58) Field of Search ...................... 95/210, 211; 96/296, 96/290, 274, FOR 121, FOR 123, 222; 261/DIG. 17, 100, 101, 102, 103, 104, 105, 106, 107

(56) References Cited

U.S. PATENT DOCUMENTS

| | | | | |
|---|---|---|---|---|
| 1,989,773 | A | * | 2/1935 | Snow |
| 3,324,630 | A | * | 6/1967 | Teller et al. |
| 3,748,828 | A | * | 7/1973 | Lefebvre |
| 3,791,102 | A | * | 2/1974 | Huntingdon |
| 3,957,464 | A | * | 5/1976 | Teller |
| 6,375,717 | B1 | * | 4/2002 | Peteln |
| 2002/0104437 | A1 | * | 8/2002 | Peteln |

FOREIGN PATENT DOCUMENTS

DE              328826       * 11/1920

\* cited by examiner

Primary Examiner—Duane S. Smith
(74) Attorney, Agent, or Firm—Smith, Gambrell & Russell, LLP (57) ABSTRACT

A method and apparatus for wet filtering machine exhaust is disclosed.

26 Claims, 5 Drawing Sheets

APPARATUS AND METHOD FOR WET FILTERING MACHINE EXHAUST

CROSS-REFERENCE TO RELATED APPLICATIONS

This application is a continuation-in-part of patent application Ser. No. 09/569,819 filed May 12, 2000, now U.S. Pat. No. 6,375,717, which is relied on and incorporated herein by reference.

BACKGROUND

The present invention relates to the wet filtering of machine exhaust. In particular, there is a need for a filter device for filtering pollutive airflow from machines. Further, there is a need to eliminate adverse smells associated with machine exhaust.

Accordingly, the present invention provides a wet filter apparatus and method for filtering machine exhaust, and providing a more desirable scent to users.

SUMMARY OF THE INVENTION

The present invention provides an apparatus and method for filtering machine exhaust to reduce health-risks to users and internal damage to machines.

The present invention further provides an apparatus and method for filtering machine exhuast that can be used by machine users that are non-technicians.

An aspect of the present invention is a wet filtering apparatus and method for limiting the expulsion of pollutants and particulate matter from machines into the ambient air.

A further aspect of the present invention is the conducting of natural ethereal oils along a foam filter stick to remove air pollutants from machine exhaust.

A further aspect of the present invention is to provide desirable scented natural ethereal oils to control adverse smells from machine exhaust.

A further aspect of the present invention is to provide a filter device that does not require a receiving receptacle for downward flowing filtering fluid.

DETAILED DESCRIPTION OF THE INVENTION

The present invention relates to an apparatus and method for wet filtering machine exhaust, and optionally (or alternatively) delivering a desired scent to the ambient air, from a variety of machines.

Although the present invention is described with regard to filtration of office machine exhaust in the preferred embodiment, those of ordinary skill in the art will appreciate that the present invention is adaptable to variety of machines in which undesired gases, spores, bacteria, and particulate pollutants are desirably filtered from entering the ambient air. Exemplary embodiments include filters of the invention attachable to or in: (a) kitchen extractor hoods for filtering spores from cooking steam; (b) humidifiers for filtering spores in the moist air spread to the environment from the humidifier; (c) radiators; (d) vacuum cleaners for filtering bacteria, dust, and spores; (e) ventilators and ventilation systems for filtering air to and from air conditioners, central heat and air systems, and the like; (f) welding smoke filtration systems; and (g) industrial filters, such as cement and lime factories, and the like, wherein dust filtration is desirable. In each of these embodiments a scented fluid, such as ethereal oil, may be used for wet filtration to generate desired smells into the air. Further, fluid mixtures used in the present invention may include bactericides or other chemicals for killing undesired pathogens.

Other embodiments of the invention also do not require a filtration function, as the present invention may be adapted for simply generating desirable smells, wherein scented fluid is conducted along a filter medium and the scent evaporates or is spread mechanically, such as by a small fan, into the ambient air. Accordingly, the size, positioning, filter housing shape, attachment means, number and size of filter sticks, and the like, can be adapted to the particular machine and intended use of the wet filter apparatus of the present invention.

In an embodiment of the present invention, a filter apparatus includes three main parts: (i) a housing with filter sticks; (ii) two oil containers, one for delivering oil along the filter sticks and the other for receiving the delivered oil; and (iii) a wide range of ethereal oils provided with desired scents.

Figure 1:
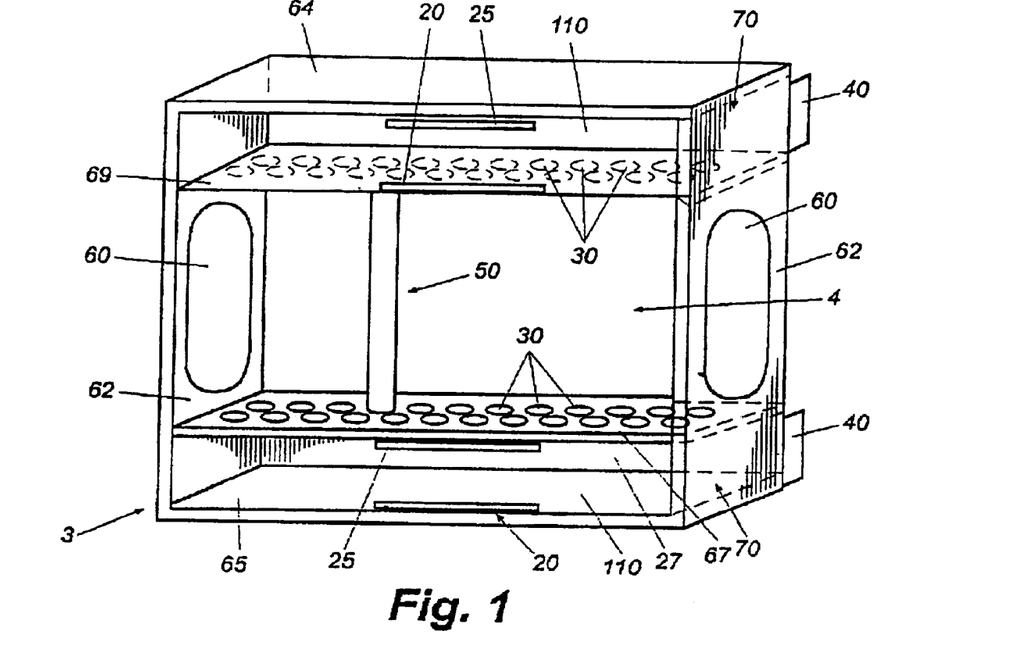
FIG. 1 is a perspective view of a filter apparatus in an embodiment of the present invention illustrating the filter housing in this embodiment without filter sticks.

Referring to FIG. 1, a filter housing (3) of the filter apparatus of the present invention is disclosed. Preferably the housing is of rectangular shape with two side walls (62), a top wall (64), and a bottom wall (65). The housing preferably comprises heat-resistant plastic, which is able to withstand a temperature of 60° to 90° Celsius, and preferably at least 90° Celsius. Although the external appearance of the housing is preferably rectangular, the housing may be square, rectangular, round, or custom-shaped based on the exhaust opening of a machine which the filter apparatus covers.

Adjacent to each of the upper top and bottom walls are preferably two oil container holding areas (110). Each of the holding areas preferably includes a back wall (27). A catch opening (25) is preferably provided along each of the back walls (27) for receiving a catch from the oil container. A locking projection (20) is further preferably provided along the bottom face of each of the holding areas for locking the respective oil containers in place. At the base of the upper holding area a holding area base plate (69) is provided with a plurality of housing filter stick openings (30). Similarly, the bottom holding area is enclosed by a base plate (67) with a plurality of housing filter stick openings (30).

Each filter stick opening (30) of base plate (69) has a corresponding filter stick opening in parallel base plate (67). The filtering section (4), the area between parallel base plates (67) and (69), preferably comprises a plurality of filter sticks (50) for conducting oil from the openings (30) in base plate (69) to the corresponding openings (30) in base plate (67).

In each of the side walls (62) an air outflow opening (60) is provided. In order to preclude the fundamental overheating of a machine, an oblong exhaust slit is preferably located on the left and right side of the housing. The exhaust slits preferably prevent excess pressure in the filter itself, since, as a result of them, the backed up or excessively produced air quantities have the possibility of being able to exit on both sides.

Preferably, one or more brackets (40) attach a side wall (62) to an office machine. The filter apparatus is preferably secured with filtering section (4) placed in front of the exhaust of the office machine. As a result of the different sizes of various ventilators, the exhaust openings of machines are of different sizes as well. In other words, the housing of a filter must be adjusted to the size of the exhaust openings, in order to receive the original air quantity flow of the machine. Otherwise, an overheating of the internal chamber of the machine could result.

The attachment bracket (40) may be a single bracket or a plurality of brackets on any one or more of the walls of the housing, depending on the machine to which the filter apparatus is attached. Housing attachments, in any form, are primarily based on the respective type of machine to which the housing is to be applied. As a result, the attachment bracket contemplates a variety of attachment means, including plastic brackets, click systems, gluing, or Velcro tape.

In an alternative embodiment, the bracket may be replaced by other attachment means, preferably hook and loop Velcro material. The Velcro material may be placed on the housing as one or more strips to the back walls of the filter and attached to the desired machine at the corresponding Velcro locations.

In another embodiment, receiving channels may be provided on the desired machine, and raised bracket areas on the back walls of the filter, preferably one area on each of the top and bottom on the back walls can slide sideways, e.g. left to right, into the brackets provided on the machine.

Preferably, in right side wall (62) an upper and lower oil container opening (70) is provided for insertion and removal of the oil containers.

Figure 8:
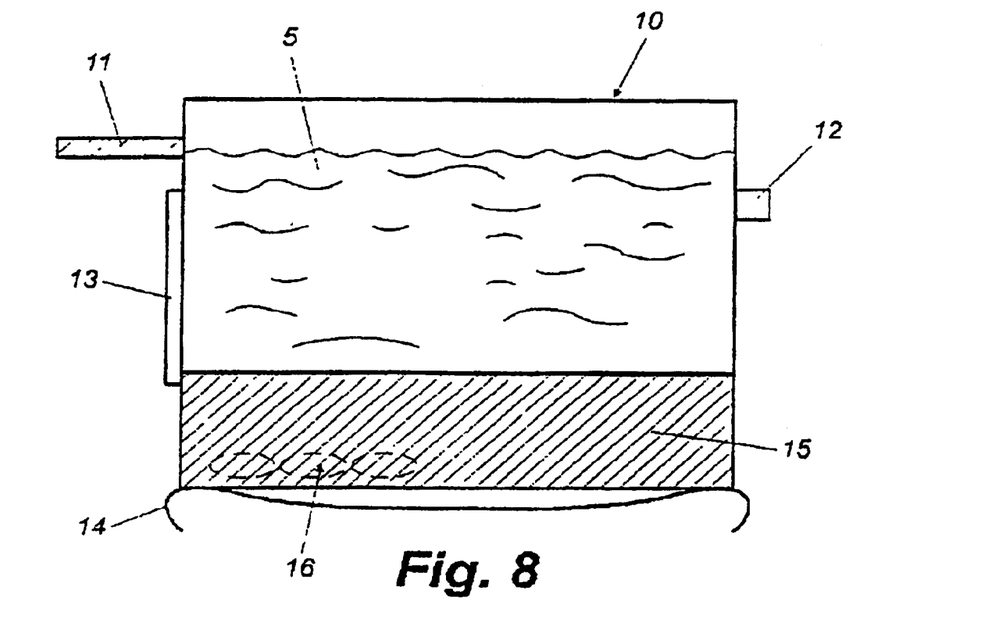
FIG. 8 is a cross-sectional side view of an oil container containing oil in a filter apparatus in an embodiment of the present invention.

Referring to FIG. 8, an oil container (10) filled with oil (5) is disclosed. The oil container preferably includes a bottom face, a left and right face, and a front and back face. The top of the container is preferably open for filling the container with oil out of the filter housing. When placed in the filter housing, a container is either closed by top wall (64) or base plate (67), depending on whether the container is an upper or lower container. In an alternative embodiment an oil filling device may be integrated with the housing and an upper oil container without removing the container from the housing.

The bottom face of the oil container preferably includes a plurality of oil flow openings (16). An oil pad (15) preferably covers the openings to slow and control the flow of oil (5) to the openings (16). In the preferred embodiment, the bottom third is filled by the pad (15), which is preferably a rubber foam pad.

On the back face of the oil container, a catch (12) is preferably attached. The front face of the oil container preferably includes a grip rail (11) for sliding the oil container in and out of the filter housing. A viewing glass (13) is also preferably provided on the front face of the oil container for a user to examine the remaining oil level.

The bottom of the oil container preferably includes one or more locking clips to secure the oil container at the locking clip projection (20) of the housing.

Preferably, the locking clips also receive a rubber closure for closing the flow openings (16). The rubber closure preferably slides between the locking clips (14) and can be inserted or removed as needed to prevent or allow the flow of oil from the openings.

Figure 2:
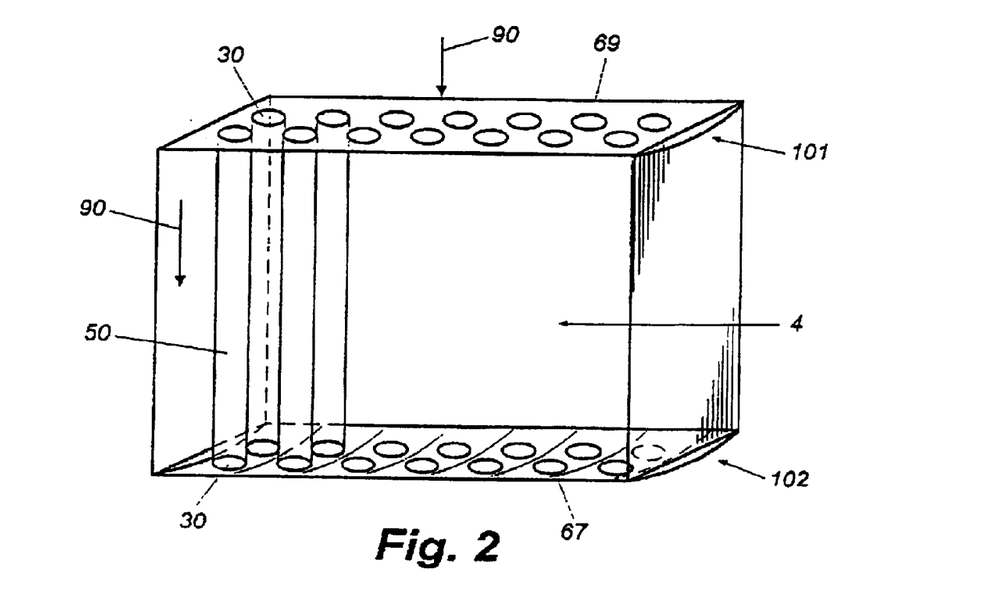
FIG. 2 is a partial top perspective view of filter sticks in the filtering section of a filter apparatus in an embodiment of the present invention.
Figure 3:
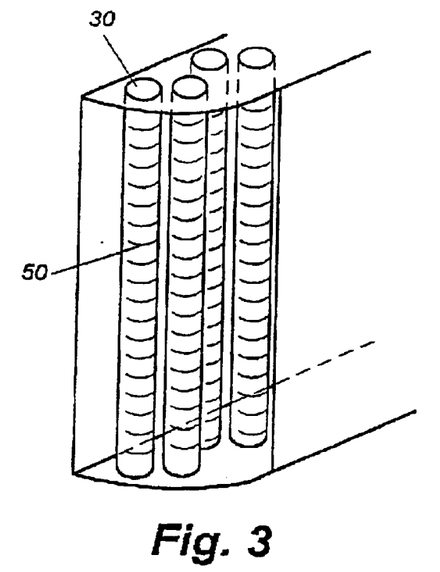
FIG. 3 is a side partial elevational view of filter sticks in the filtering section of a filter apparatus in an embodiment of the present invention.

Referring to FIGS. 1, 2, and 8 an oil container (10) filled with oil and without closure (18) is inserted through upper opening (70) into the upper container holding area (110) of the filter housing (3). The oil container catch (12) connects into catch opening (25). Locking clips (14) preferably connect to one or more locking projections (20) by a click locking system to prevent the containers from falling out. The plurality of flow openings (16) are adjacent to filter stick openings (30).

The second oil container (10) initially does not contain oil and includes rubber closure (18) to close the plurality of flow openings (16). The second oil container is inserted into lower holding area (110) of the housing. The open top of the lower oil container is preferably adjacent to the plurality of filter stick openings in base plate (67) of the housing.

Preferably oil (5) in the upper oil container slowly flows through the pad (15) to and through the oil flow openings (16) and into the filter stick openings (30). Gravity causes the oil to flow (90) downward along the plurality of filter sticks (50). The oil continues to flow downward to the filter stick openings (30) in base plate (67). The oil subsequently drips off into the lower oil container.

Figure 7:
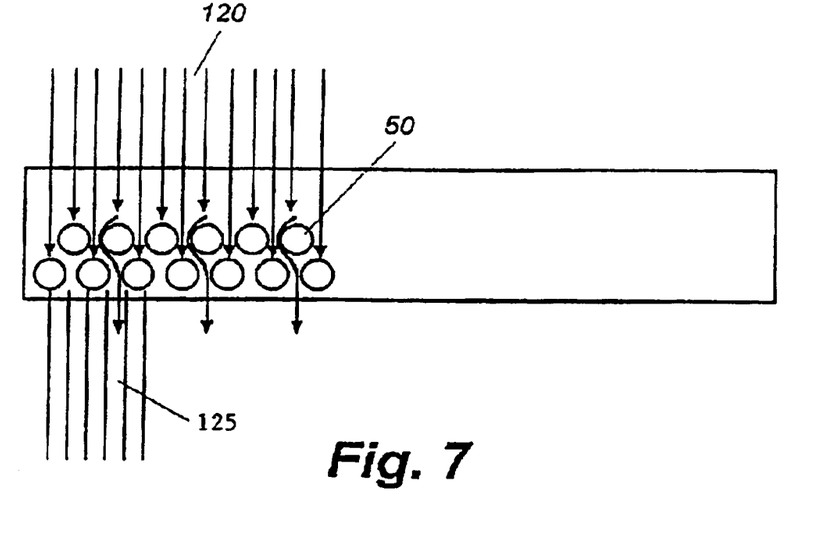
FIG. 7 is top cross-sectional view of filter sticks in the filtering section and the associated filtration of polluted air in a filter apparatus in an embodiment of the present invention.

Referring to FIG. 7 exhaust (120) from an office machine blows through the filtering section of the filter apparatus. Ozone particulates, and other pollutants contact the oil along filter sticks (50) and are removed from the exhaust. Filtered air (125) flows out of the filtering section (4) and into the ambient air from the filter apparatus.

Figure 6:
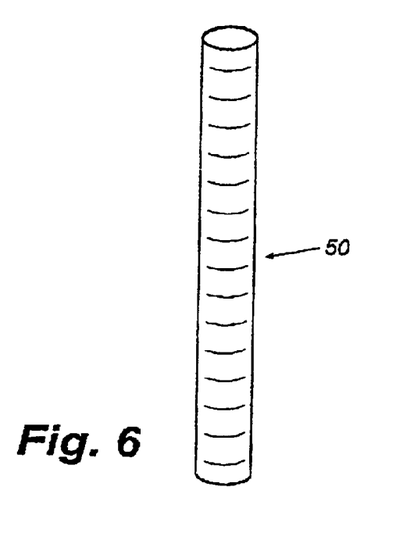
FIG. 6 is a perspective view of a filter stick of a filter apparatus in an embodiment of the present invention.

Referring to FIG. 6, the filters sticks (50) are preferably round, perpendicularly standing foam rubber rods of approx. 5–6 mm in diameter and a perforated plastic surface which are perpendicular and staggered to one another. In alternative embodiments the filter sticks may be of various shapes including oval, square, rectangular, triangular, and other shapes.

The filter sticks, or foam rubber rods, are preferably a fixed component and are attached to the housing at the corresponding filter stick openings in base plates (67) and (69). The filter sticks are also preferably perpendicular in order to enable the automatic flow of oil by gravity. The filter sticks are further preferably staggered, in order to force the outflowing air quantities to flow around the foam rubber rods. The distance from one foam rubber rod to another preferably is no greater than 2 mm. The foam rubber rods may be preferably filled but can also be hollow.

Figure 4:
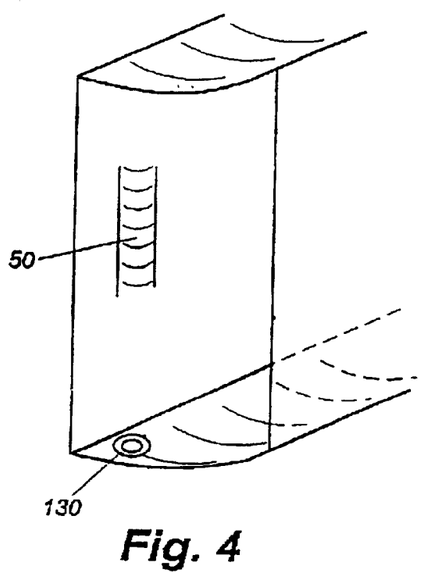
FIG. 4 is a side partial elevational cut-away view of a filter apparatus in an embodiment of the present invention showing a security ring and a filter stick's relationship therewith.
Figure 5:
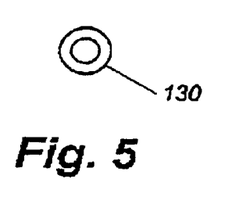
FIG. 5 is a top perspective view of a security ring of the filter apparatus in an embodiment of the present invention.

Referring to FIGS. 4 and 5 a security ring (130) is provided in the preferred embodiment to maintain the distance between the filter sticks. The filter sticks are preferably maintained perpendicular to base plates (67) and (69), and parallel to one another.

The foam rubber material of the filter sticks preferably prevents a rapid flow of oil from the full upper oil container into the lower empty oil container. In addition, the individual foam rubber rod is preferably mechanically strengthened internally by the perforated plastic surface (simultaneously a mechanical protection against external damage, such as during cleaning). The perforation permanently allows low moisture on the external surface of the rods. As a result of this surface moisture, microscopically small particles which are located in the exhaust flowing out of a machine by means of ventilators are preferably captured and deposited on the external cover of the foam rubber rods (the finest toner particles, oil residues, silicones, oils of all types, as well as dust and environmental air pollution).

Referring to FIG. 2, around these filter sticks there are light channels (101) and (102) along the respective length of base plates (67) and (69). The channels prevent possible outflow of the ethereal oil during a change of the oil containers.

In a preferred embodiment, the oil (5) is natural ethereal oil including water and an emulsifier, which may have a desired scent. As the pollutants are removed by the oil flowing along the filter sticks, the desired scent from the ethereal oil is mixture provided into the air by the warm air from the exhaust of an office machine. Accordingly, both filtration and a desirable scent are achieved by the filter apparatus.

In the preferred embodiment of a method of the present invention, an oil container is filled with ethereal oil of a desirable scent and placed in the upper oil container holding area. A second, empty oil container is placed into the lower container holding area. Each of these oil containers preferably comprises heat-resistant and acid-resistant and mechanically solid plastic.

The internal construction of each container, full or empty, is preferably the same. In order to prevent the oil which is contained in the container from being able to flow out too quickly, the lower part of the interior side of the container is designed with a foam rubber pad (along the entire length and over all openings into which the foam rubber rods lock). This foam rubber pad preferably fills approximately the lower third of the entire container and will draw the ethereal oil, but only slowly allow it to pass through to the foam rubber rods.

In the preferred embodiment, once the upper oil container is essentially empty, and the lower container has received the flowing oil, the containers may be switched. Preferably the closure on the lower container is removed, opening the oil flow openings, and the lower container is inserted into the upper container holding area. The closure is inserted at the base of the empty upper container, thereby closing the oil openings, and the empty container is inserted into the lower holding area. Preferably, this process may be repeated for up to three months, depending on the rate of loss of the ethereal oil mixture.

Figure 9:
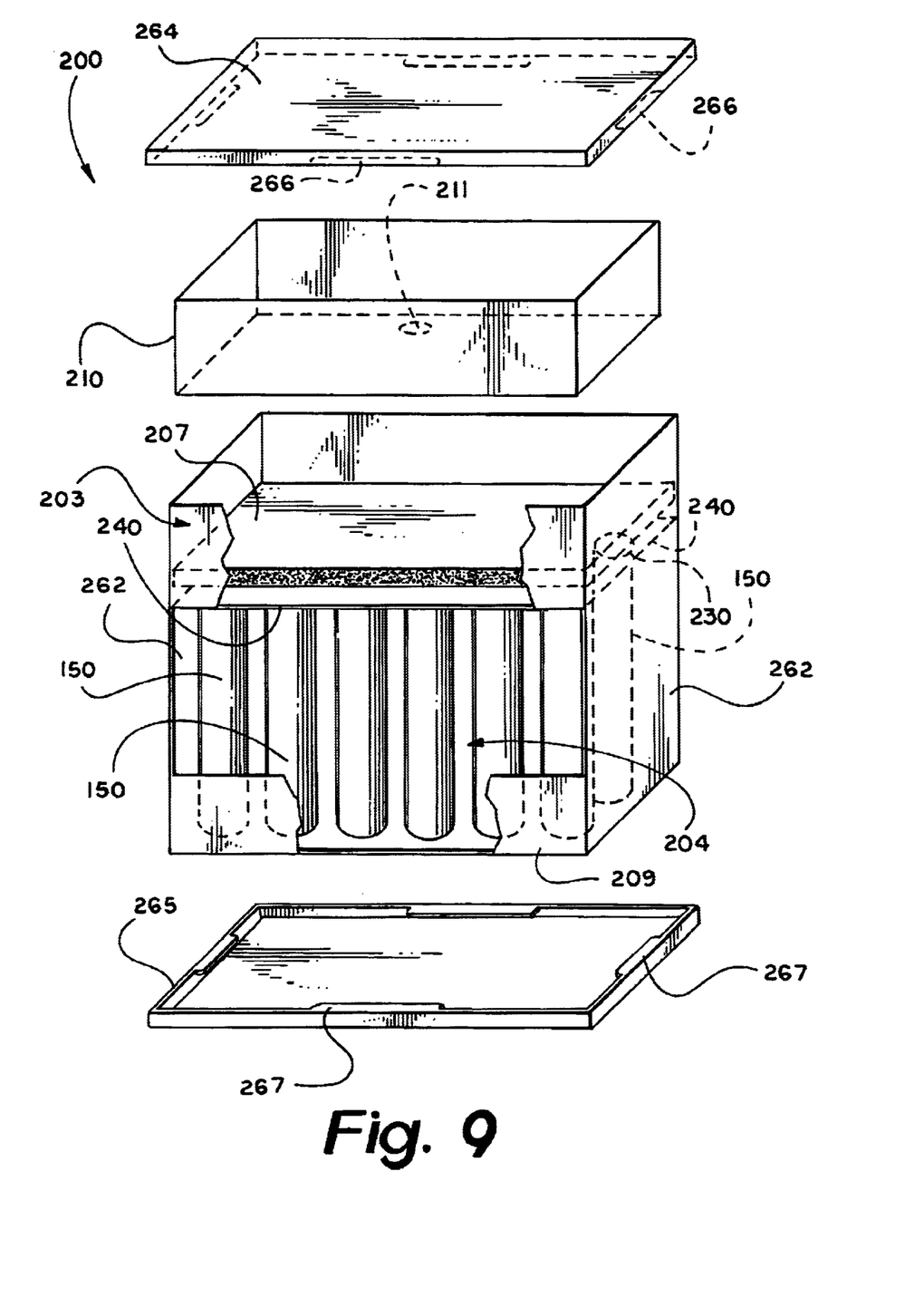
FIG. 9 is a transparent perspective view of a filter apparatus in an alternative embodiment of the present invention.

Referring to FIG. 9, an alternative embodiment of a filter apparatus of the present invention is shown. In the embodiment of FIG. 9, the capillary effect allows an oil mixture to flow back up the filter sticks (150), eliminating the need for a lower oil receiving container (110) (FIG. 1). Further, in the alternative embodiment, the need for air flow openings (60) is also eliminated.

With continuing reference to FIG. 9, a filter apparatus (200) of an embodiment of the present invention is disclosed. Preferably the housing is of rectangular shape with two sidewalls (262), a top lid (264), and a bottom lid (265). The housing preferably comprises heat-resistant plastic which is able to withstand a temperature of at least 60° to 90° C., and preferably at least 90° C. Those of ordinary skill in the art will appreciate that the housing may also be custom-shaped to accommodate the exhaust opening of any desired machine which the filter apparatus (200) is intended to cover.

Between each of the sidewalls (262), a filtering section (204) is provided. A filter medium, preferably a plurality of foam filter sticks (150), is housed within the filtering area (204). The filtering area (204) is on at least one face exposed to the ambient atmosphere, and the opposite face of filtering section (204) is positioned in the line of machine exhaust, such that exhaust air to be filtered flows through the filtering section (204).

Figure 10:
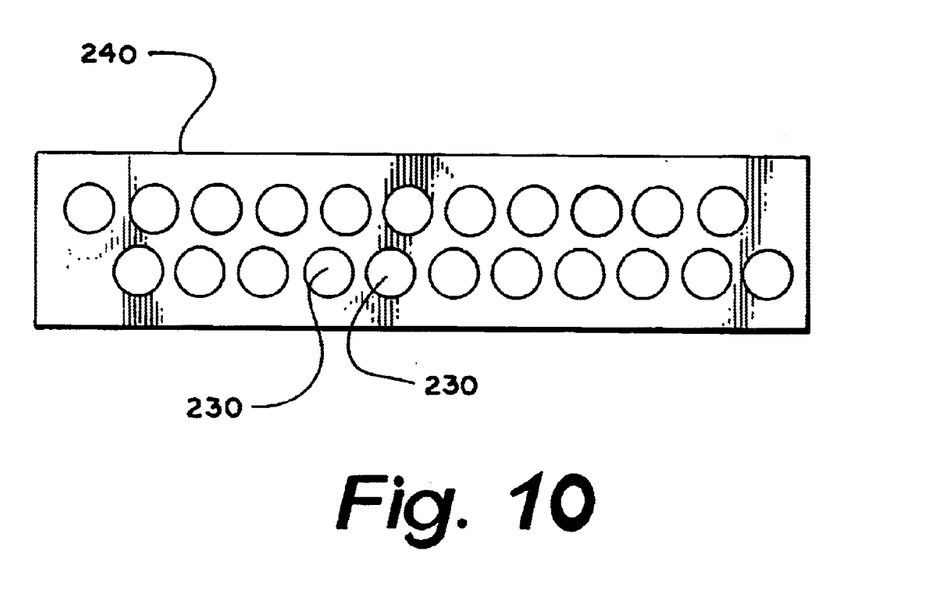
FIG. 10 is a top plan view of the top base plate of a filter apparatus in an embodiment of the present invention illustrating the top base plate including the upper portions of a plurality of filter sticks.

Referring to FIGS. 9 and 10, each of the filter sticks (150) is held in place by top base plate (240). The upper portions, or tops (230), of the filter sticks (150) are secured within appropriately sized holes in the plate (240). Those of ordinary skill in the art will appreciate that the holes in plate (240) secure the filter sticks in a desired position and that any holding mechanism along the length of the plurality of filter sticks (150) may be used in alternative embodiments. Exemplary securing means may include wires, rods, one or more holding plates in different locations along the length of the filter sticks, and the like.

Plate (240) forms the bottom of the upper holding area (203) of the filter apparatus (200). Within holding area (203) an absorbent pad (207), preferably rubber foam, rests atop the filter sticks (150).

An oil container (210) fits on top of pad (207) within holding area (203). At least one hole (211) is provided in oil container (210) to allow an oil mixture within the container (210) to flow through the hole (211) onto pad (207) and into filter sticks (150).

A top lid (264) is provided with locking ridges (266) to snap onto the top of the filter apparatus (200) and enclose holding area (203).

Figure 11:
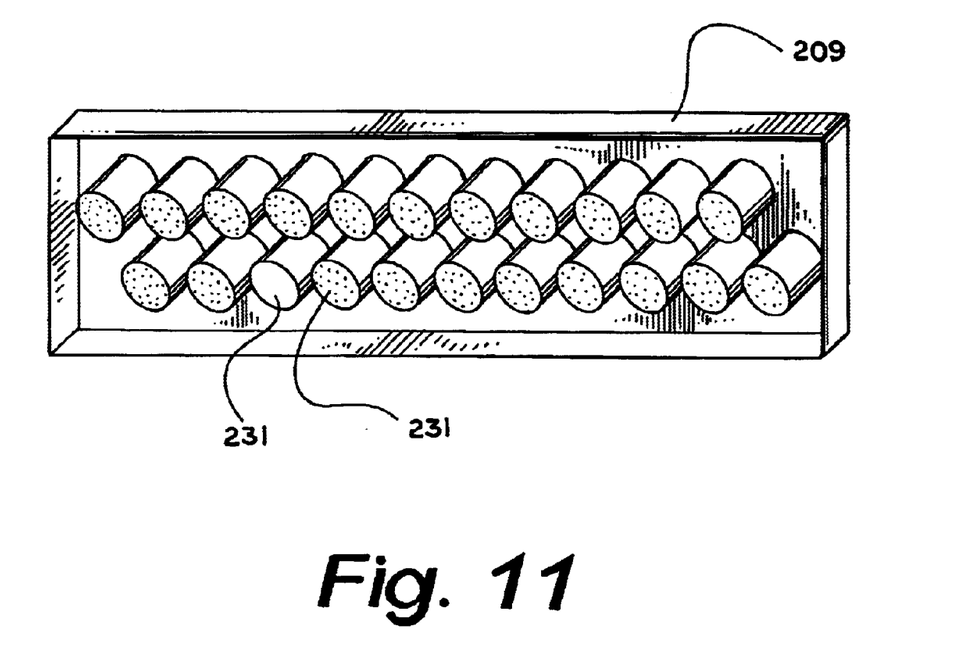
FIG. 11 is a top plan view of the bottom of a filter apparatus in an embodiment of the present invention illustrating the bottom of the apparatus including the lower portions of a plurality of filter sticks.

Referring to FIGS. 9 and 11, below filtering area (204) the lower portion of the filter apparatus (200) includes lower surrounding wall (209). Lower wall (209) preferably includes a wall in front of the lower portion of the filtering sticks (150), a wall behind the lower portion of filtering sticks (150), and shares common sidewalls with walls (262).

Viewing filter apparatus (200) from the bottom, as shown in FIG. 11, the lower portions of the filter sticks (150) extend between surrounding wall (209). The lower portions of the filter sticks (150) may omit being secured in a base plate. While a base plate may be provided to secure the bottom portions (231) of the filter sticks (150), the present embodiment alternatively provides a bottom lid (265) with locking ridges (267) that snap behind wall (209) to close the bottom of the filter apparatus (200) and catch any fluid flow.

Referring again to FIG. 9, a filtering fluid, preferably an ethereal oil and water mixture, flows through hole (211) in oil container (210) to pad (207). Those of ordinary skill in the art will appreciate that oil container (210) may be shaped to slant the oil flow toward one or more holes that allow the oil to pass to pad (207). Pad (207) helps distribute and control the rate of oil flow to the tops (230) of filter sticks (150). Gravity causes the oil to flow downward along the plurality of filter sticks (150). The oil continues to flow downward through filtering area (204) until reaching the bottom portion (231) of each of the filter sticks (150).

In the present embodiment of the invention, the bottoms (231) of the filter sticks (150) may touch the bottom lid (265) when it is secured in the filter apparatus (200). The collecting oil mixture at the bottom portions (231) of the filter sticks (150) and on the inside of lid (265) may be drawn back up the filter sticks (150) through the capillary effect. Accordingly, the filter sticks (150) maintain a continuous wetness for filtering machine exhaust.

As shown in FIG. 7, and with continuing reference to FIG. 9, the filter sticks (150) in the filtering apparatus (200) are arranged in the line of flow of desired machine exhaust. Pollutants and particulates contact the oil along the filter sticks (150) and are removed from the exhaust. Filtered air (125) (FIG. 7) flows out of the filtering section (204) into the ambient air from the filter apparatus.

In a further embodiment, the filter sticks are preferably washable. The filter apparatus may be removed from the machine and washed with a cleansing agent, such as water, to remove the pollutants which build-up on the filter sticks.

In an alternative embodiment, the filter housing may be discarded, and a filter apparatus with fresh filter sticks may be attached at desired filter-changing intervals for the office machine.

In other embodiments, the filter apparatus of the present invention may be used for delivering desired scents into the ambient air without concern for filtering, such as attachment to or incorporation in a blowing machine, fan or the like, where polluted exhaust is not present, but a favorable scent is desired. Embodiments of the present invention for scent delivery include use with heating and cooling vents, such as in buildings and motor vehicles. Further, the apparatus of the present invention may be shaped into aesthetically desired shapes or decorated with colors, prints, and the like, to serve as a decorative scent delivery system.

Ethereal oils have very good properties for controlled flow, filtering and providing desired scents into the ambient air. Preferably lime-free normal water and an emulsifier may be added to natural ethereal oil to achieve desired flow rates and filtering reactions. Natural ethereal oil, such as available from Kneipp Werke, Würzburg, Germany, is preferred in the present invention. Those of ordinary skill in the art will appreciate that the ratio of oil and water mixture is determined based on parameters such as humidity, temperature, evaporation rate, scent of oil, rate of exhaust flow, and type of filter sticks. The natural ethereal oil mixture also advantageously kills germs which could result from the water in the oil mixture.

While the invention has been described with reference to the structures and methods disclosed, it is not confined to the details set forth but is intended to cover such modifications or changes as may fall within the scope of the following claims.

What is claimed is:

1. An apparatus for wet filtering machine exhaust comprising:
   a. a plurality of filter sticks secured in a filter, wherein said filter sticks are constructed to filter machine exhaust;
   b. a fluid mixture delivery container for delivering a fluid mixture to the filter sticks;
   c. a positioning attachment for attaching the filter to a machine with the plurality of filter sticks in the line of flow of the machine exhaust; and
   d. an adsorbent pad atop the filter sticks for controlling the flow of fluid mixture to the filter sticks.

2. The apparatus of claim 1 wherein the fluid mixture delivery container includes a removable lid.

3. The apparatus of claim 1 wherein the filter includes a removable lid beneath the filter sticks for accessing the filter sticks.

4. An apparatus for wet filtering machine exhaust comprising:
   a. a plurality of filter sticks secured in a filter, wherein said filter sticks are constructed to filter machine exhaust;
   b. a fluid mixture delivery container for delivering a fluid mixture to the filter sticks, wherein the fluid mixture delivery container includes an ethereal oil mixture; and
   c. a positioning attachment for attaching the filter to a machine with the plurality of filter sticks in the line of flow of the machine exhaust.

5. The apparatus of claim 4 wherein the ethereal oil mixture includes natural ethereal oil, water, and an emulsifier.

6. The apparatus of claim 5 wherein the ethereal oil mixture is scented.

7. The apparatus of claim 3 wherein the fluid mixture delivery container includes natural ethereal oil, water, and an emulsifier.

8. The apparatus of claim 7 wherein the oil mixture is scented.

9. An apparatus for wet filtering machine exhaust comprising:
   a. a plurality of filter sticks secured in a filter, wherein said filter sticks are constructed to filter machine exhaust;
   b. a fluid mixture delivery container for delivering a fluid mixture to the filter sticks; and
   c. a positioning attachment for attaching the filter to a machine with the plurality of filter sticks in the line of flow of the machine exhaust, wherein the attachment is a hook and loop attachment.

10. A method for wet filtering machine exhaust comprising positioning a plurality of filter sticks in the line of flow of machine exhaust, delivering fluid mixture to the filter sticks, wherein the fluid mixture includes ethereal oil, and disposing of pollutants from the machine exhaust collected on the filter sticks.

11. The method of claim 10 wherein the fluid mixture includes natural ethereal oil, water, and an emulsifier.

12. The method of claim 11 wherein the fluid mixture is scented.

13. A method for wet filtering machine exhaust comprising positioning a plurality of filter sticks in the line of flow of machine exhaust, delivering a fluid mixture to the filter sticks, wherein the fluid mixture includes natural ethereal oil, water, and an emulsifier, and disposing of pollutants from the machine exhaust collected on the filter sticks, wherein said disposing of pollutants includes washing the filter sticks.

14. The method claim 13 wherein the fluid mixture is scented.

15. The method of claim 10 wherein said disposing of pollutants includes discarding one or more filter sticks.

16. The method of claim 15 wherein the fluid mixture is scented.

17. An apparatus for providing a desired smell into the environment comprising:
   a. one or more fluid conduction sticks;
   b. a scented fluid mixture conducted along said one or more sticks; and
   c. a fluid delivery container for delivering the scented fluid mixture to the sticks.

18. The apparatus of claim 17 wherein the fluid delivery container is refillable.

19. The apparatus of claim 18 wherein the scented fluid mixture comprises ethereal oil.

20. The apparatus of claim 19 wherein the scented fluid mixture comprises natural ethereal oil water and emulsifier.

21. The apparatus of claim 17 wherein the scented fluid mixture comprises ethereal oil.

22. The apparatus of claim 20 wherein the scented fluid mixture comprises natural ethereal oil, water and emulsifier.

23. The apparatus of claim 22 further comprising a fan attached behind said one or more sticks for blowing said smell into the ambient air.

24. The apparatus of claim 17 further comprising a fan attached behind said one or more sticks for blowing said smell into the ambient air.

25. The apparatus of claim 18 further comprising a fan attached behind said one or more sticks for blowing said smell into the ambient air.

26. The apparatus of claim 19 further comprising a fan attached. behind said one or more sticks for blowing said smell into the ambient air.

* * * * *